United States Patent
Roy et al.

(10) Patent No.: US 7,483,025 B2
(45) Date of Patent: Jan. 27, 2009

(54) VECTOR-BASED GEOGRAPHIC DATA

(75) Inventors: Gregory Andrew Roy, Calgary (CA);
Osman Hamid Bux, Calgary (CA);
Kevin Glen Robinson, Calgary (CA);
Roderick Gaetan Munro, Calgary (CA)

(73) Assignee: Autodesk, Inc., San Rafael, CA (US)

( * ) Notice: Subject to any disclaimer, the term of this patent is extended or adjusted under 35 U.S.C. 154(b) by 178 days.

(21) Appl. No.: 10/642,857

(22) Filed: Aug. 18, 2003

(65) Prior Publication Data

US 2004/0032411 A1 Feb. 19, 2004

(51) Int. Cl.
*G06T 15/00* (2006.01)

(52) U.S. Cl. .................. 345/440; 382/113; 707/3; 707/10; 715/853

(58) Field of Classification Search .......... 345/440, 345/441, 427; 380/25; 707/3, 10; 715/500.1, 715/501.1, 513, 853, 854, 855; 382/180, 382/113

See application file for complete search history.

(56) References Cited

U.S. PATENT DOCUMENTS

| | | | | |
|---|---|---|---|---|
| 4,843,569 | A | * | 6/1989 | Sawada et al. .............. 382/180 |
| 5,231,584 | A | | 7/1993 | Nimura et al. |
| 5,528,248 | A | | 6/1996 | Steiner et al. |
| 5,559,707 | A | | 9/1996 | DeLorme et al. |
| 5,673,421 | A | | 9/1997 | Shirakawa |
| 5,689,431 | A | | 11/1997 | Rudow et al. |
| 5,727,159 | A | | 3/1998 | Kikinis |
| 5,809,145 | A | * | 9/1998 | Slik et al. ...................... 705/52 |
| 5,847,708 | A | * | 12/1998 | Wolff ........................ 715/764 |
| 5,848,373 | A | | 12/1998 | DeLorme et al. |
| 5,966,135 | A | | 10/1999 | Roy et al. |
| 5,973,678 | A | | 10/1999 | Stewart et al. |
| 5,974,431 | A | | 10/1999 | Iida |
| 5,995,101 | A | | 11/1999 | Clark et al. |
| 6,040,824 | A | | 3/2000 | Maekawa et al. |
| 6,057,854 | A | | 5/2000 | Davis, Jr. et al. |
| 6,083,353 | A | * | 7/2000 | Alexander, Jr. ............. 202/158 |
| 6,124,858 | A | | 9/2000 | Ge et al. |

(Continued)

OTHER PUBLICATIONS

Goodenough et al, Queries and Their Application to Reasoning with Remote Sensing and GIS, IEEE, Feb. 1994, pp. 1199-1203.*

(Continued)

*Primary Examiner*—Phu K Nguyen
(74) *Attorney, Agent, or Firm*—Gates & Cooper LLP

(57) ABSTRACT

The present invention discloses a method, apparatus, and article of manufacture for a computer implemented geographic information system that enables viewing a map picture that is generated from vector-based data. Map pictures can be generated with vector-based data. Map pictures created with vector-based data can be viewed. Additionally, map pictures are comprised of map objects, such as states and cities. Map objects can be chosen to obtain additional information, for example, a different map picture. Additionally, areas of the map picture can be zoomed in on to view the areas with greater resolution or to obtain additional data about the areas. Furthermore, when a user requests to view a map picture, only the map data required to respond to the user's request is downloaded to generate a map picture. As a user makes additional requests for information, additional map data is downloaded and new map pictures generated.

18 Claims, 5 Drawing Sheets

U.S. PATENT DOCUMENTS

| | | | |
|---|---|---|---|
| 6,166,734 | A | 12/2000 | Nahi |
| 6,182,010 | B1 | 1/2001 | Berstis |
| 6,192,518 | B1 | 2/2001 | Neal |
| 6,321,158 | B1 | 11/2001 | DeLorme et al. |
| 6,337,693 | B1 | 1/2002 | Roy et al. |
| 6,343,290 | B1 | 1/2002 | Cassius et al. |
| 6,370,449 | B1 | 4/2002 | Razavi et al. |
| 6,456,938 | B1 | 9/2002 | Barnard |
| 6,477,575 | B1 | 11/2002 | Koeppel et al. |
| 6,505,242 | B2 | 1/2003 | Holland et al. |
| 6,542,813 | B1 | 4/2003 | Kovacs |
| 6,560,620 | B1 | 5/2003 | Ching |
| 6,604,046 | B1 | 8/2003 | Van Watermulen et al. |
| 6,654,683 | B2 | 11/2003 | Jin et al. |
| 2002/0128903 | A1 | 9/2002 | Kernahan |

OTHER PUBLICATIONS

Drutman et al., Marine Geophysics Modeling With Geographic Information Systems, IEEE, May 1994, pp. III 528-531.*

Kersting et al., Interactive 3D Visualization of Vector Data in GIS, GIS'02, ACM, Nov. 2002, pp. 107-112.*

Kochevar et al., The Tecate Data Space Exploration Utility, Jul. 1995, pp. 157-164.*

Damer, Inhabited Virtual Worlds, ACM Interaction Design, Sep. 1996, pp. 27-34.*

Durand et al., MAPA: a system for inducing and visualizing hierarchy in Websites; ACM Jun. 1998; pp. 66-76.*

Bieber et al., Designing Hypertext Support for Computational Applications, Communications of the ACM, Aug. 1995, pp. 99-107.*

ARGU95, Argus User's Guide 3.0, The Next Generation in GIS, Munro Garrett International, May 1994, p. 176-180.

SOFT95, Specification for the Simple Vector Format (SVF) v1.1, article, SoftSource, Bellingham, WA, 1995, pp. 1-8.

XERO95, Map Viewer Technical Details, Xerox Corporation, Jun. 2, 1995, 3 pp.

XERO95, Mapwriter (1) User Commands, Xerox Corporation, Nov. 5, 1993, 4pp.

XERO95, About the Xerox PARC Map Viewer, Xerox Corporation, Jun. 1993, 1p.

* cited by examiner

VECTOR-BASED GEOGRAPHIC DATA

CROSS-REFERENCE TO RELATED APPLICATIONS

This application claims the benefit under 35 U.S.C. Section 120 of the following co-pending and commonly-assigned U.S. patent application(s), which is/are incorporated by reference herein:

Application Ser. No. 10/008,625, filed Dec. 6, 2001, by Gregory Andrew Roy, Osman Hamid Bux, Kevin Glen Robinson, and Roderick Gaetan Munro, entitled "VECTOR BASED GEOGRAPHIC DATA", which application is a continuation of commonly-assigned patent application Ser. No. 09/411,506, filed Oct. 4, 1999, by Gregory Andrew Roy, Osman Hamid Bux, Kevin Glen Robinson, and Roderick Gaetan Munro, entitled "VECTOR BASED GEOGRAPHIC DATA", now U.S. Pat. No. 6,337,693, issued on Jan. 8, 2002, which application is a continuation of commonly-assigned patent application Ser. No. 08/757,706, filed on Oct. 30, 1996, by Gregory Andrew Roy, Osman Hamid Bux, Kevin Glen Robinson, and Roderick Gaetan Munro, entitled "VECTOR BASED GEOGRAPHIC DATA", now U.S. Pat. No. 5,966,135, issued on Oct. 12, 1999.

BACKGROUND OF THE INVENTION

1. Field of the Invention

This invention relates in general to computer implemented geographic information systems, and in particular to a geographic information system using vector-based data.

2. Description of Related Art

Computer implemented geographic information systems are known in the art. However, these geographic information systems display map pictures that are generated using raster data. Raster data represents a map picture with points in a grid. For example, on an X-Y axis, there may be a thousand points in the X direction and seven hundred and sixty points in the Y direction. Each of these points represents a color. For example, some computer systems enable each point to represent one of eight colors. A map picture is then created by determining a color for each point in the grid.

Each map picture is static in that portions of the map picture cannot change independently of each other. That is, a portion of a map picture cannot be modified while viewing the map picture. When a portion of the map picture is to be modified, the entire map picture is replaced. For example, each map picture, such as one representing the United States (US), may contain several layers of information, such as states, counties, and streets. When a user is viewing a map picture of the United States and wishes to view the counties in a particular state, the map picture is replaced with another map picture that contains the additional information. Typically, the additional information is stored at a server computer and the map picture is displayed at a client computer. When the map picture that is displayed is to be modified, the additional information is downloaded from the server computer. Because this additional information is in the form of raster data, it is typically time-consuming to download this information.

Additionally, some computer systems display schematics generated from vector-based data in computer aided design (CAD) files. Vector-based data uses descriptions of elements of the schematic to create the schematic. For example, if the schematic contains a line segment, the CAD file describes the line segment with an endpoint and a length. Moreover, these computer systems enable users to view data in CAD files from the Internet and Intranets. For instance, when a user at a computer system wishes to view a schematic, the computer system downloads all of the data in the CAD file for that schematic from a data storage device via the Internet. The CAD file typically contains data corresponding to different levels of design of the schematic. In some instances, a user may wish to view only some of the data in the files, for example, the highest level of design of the schematic. In this case, although only a portion of data is required to display the schematic requested by the user, the computer system has already downloaded all of the data in the CAD file. Because it is time-consuming to download all of the data, it is inefficient to do so when only a portion of the data is required to satisfy a user's request.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented geographic information system that enables efficiently viewing a map picture that is generated from vector-based map data retrieved over the Internet or Intranets. In accordance with the present invention, a user can define map pictures with vector-based data. A user can also view map pictures defined with vector-based data. In particular, when a user requests to view a map picture, only the map data required to satisfy the request is downloaded. When a user requests additional information, additional map data is downloaded to satisfy the request. Moreover, map pictures are comprised of objects, such as states and cities. When the object includes a link to additional map data, a user can obtain additional information, for example, map data for a different map picture. In this case, additional information may be downloaded. Additionally, in accordance with the present invention, a user can zoom in on an area of the map picture to either view the area with greater resolution or obtain additional information about the area.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
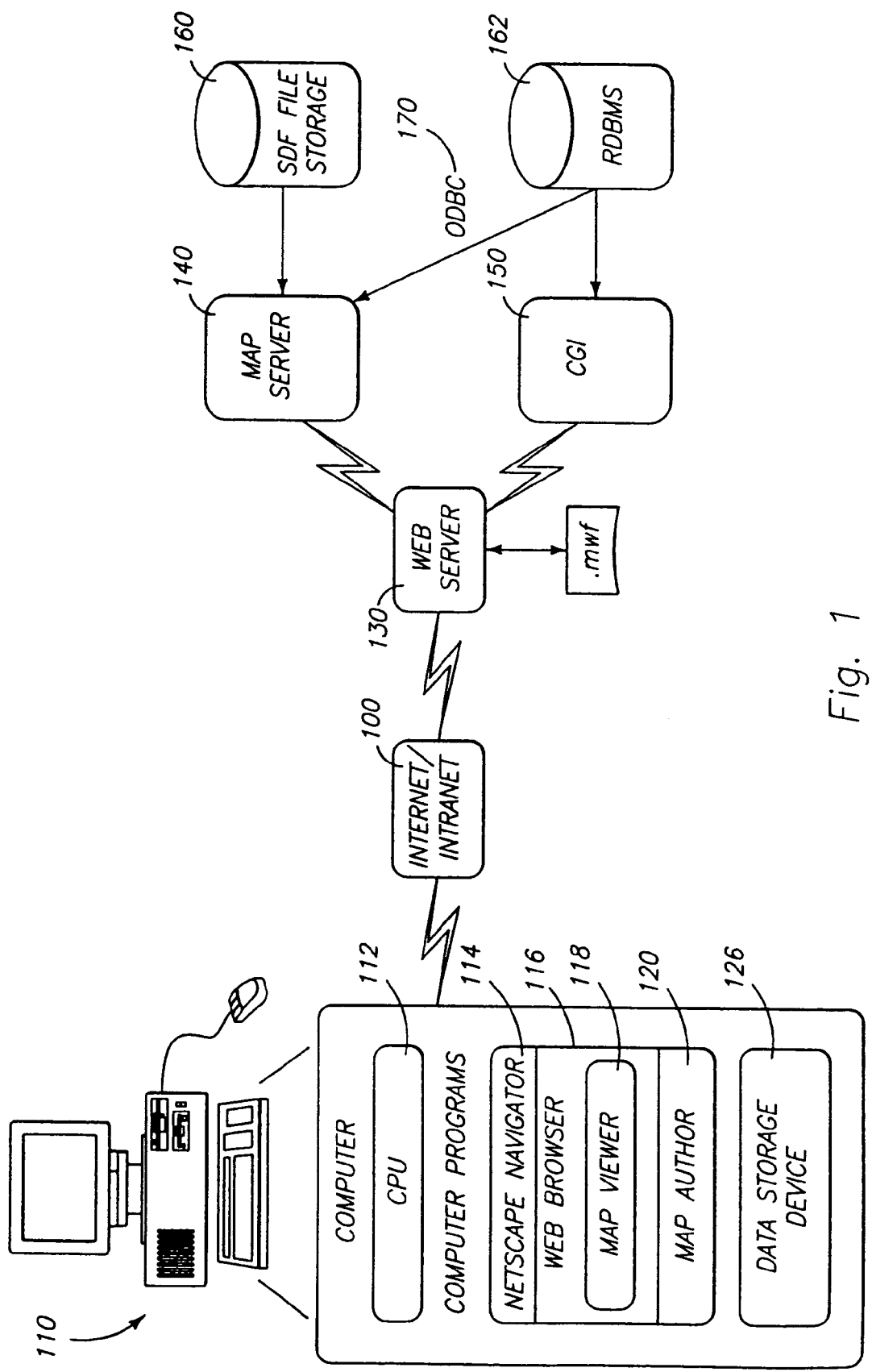
FIG. 1 is a block diagram of an exemplary hardware environment of the preferred embodiment of the present invention.

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The present invention comprises a vector-based geographic information system that enables creating map window files containing map definition information that defines a map picture, storing and transmitting map data, and viewing map pictures generated using the map data. In particular, the present invention includes one or more computer programs that include a map viewer for viewing map pictures, a map author for defining map pictures, and a map server for storing and transmitting map data over the Internet or over Intranets.

A user (i.e., author) uses the map author to create map window files that contain map definition information. The map definition information identifies map layers. Each map layer identifies a grouping of map objects, which are graphical entities. In particular, a map picture can have several map layers, each map layer providing additional information for the map picture. A map layer can either be static or dynamic. For a static map layer, map data is embedded in the map window file as a computer graphic metafile (CGM), and for a dynamic map layer, the location of the map data is identified in the map window file. For dynamic map layers, the map data for a map layer is stored in a spatial data format (SDF) file at one or more map servers. The map window file either includes a static map layer or a dynamic map layer that is used to generate an initial map picture. The initial map picture is displayed when a user requests to view the map picture.

The map window file is stored on a Web server, and the map data that is identified by the map definition information is stored on one or more map servers. The map viewer is used by a user to view map pictures. In particular, when a user inputs a request to view a map picture, the map viewer downloads a map window file from a Web server. Then, the map viewer reads the map definition information in the map window file to identify the map layer identifying the map data needed to generate an initial map picture. When the map definition information identifies the location of map data, the map viewer downloads this map data from the specified map server to generate the map picture. The map viewer then displays the initial map picture on a computer display device. As the user makes requests for additional information for the map picture, the map viewer downloads additional map data identified in the map window file from a map server.

Until now, geographic information system use on the Internet has been limited to simple applications utilizing map pictures generated from raster data. The present invention provides a net-based, client/server framework for real-time access to dynamic map pictures and associated map data through a Web browser interface suitable for a wide range of users, from geographic information system professionals to casual computer users. In particular, the present invention enables corporate customers and developers who use the Internet and business Intranets to display and interact with vector-based map data for applications that include tracking customers, allocating resources, and managing facilities or infrastructure.

The map data used to generate a map picture may be a combination of map objects and graphic objects. The map objects can have uniform resource locator (URL) links. When a map object having a URL link is chosen, the present invention jumps directly to data identified by the URL link, such as other map pictures, documents, images, and Web sites. An individual map object is chosen by pointing at the map object with a mouse pointer and double clicking the mouse button. The present invention also enables choosing multiple map objects through various techniques, such as choosing multiple objects from lists or using a spatial technique of enclosing multiple objects within a circle or polygon. Information related to the chosen map objects can be presented in reports.

Furthermore, users can navigate through the map picture to view different areas of the map, for example, by zooming in on areas of interest. When zooming in on an area requires obtaining additional map data, the map viewer reads the map window file to obtain the location of the additional map data. The map viewer downloads this additional map data and generates a new map picture with the additional data. Then, the map viewer displays this new map picture.

Hardware Environment

FIG. 1 is a block diagram that illustrates an example of a hardware environment for the preferred embodiment of the present invention, and more particularly, illustrates a typical distributed computer system using the Internet and Intranets 100 to connect client computers 110 executing, for example, a computer program embodying the present invention that enables users at the client computers 110 to view map pictures, to map server computers 140 executing a computer program embodying the present invention that transmits vector-based map data to the client computers 110. A typical combination of resources may include client computers 110 that are personal computers or work stations connected via the Internet 100 to server computers 130, 140 that are personal computers, workstations, mini computers, or mainframes.

Generally, the client computers 112 are comprised of one or more CPUs 112, various amounts of RAM storing computer programs 113, such as a Netscape Navigator 114, a map viewer 118 for viewing map pictures, a Web browser 116 for accessing information over the Internet, and a map author 120, and other data and components typically found in computers. Generally, the server computers 130, 140 are comprised of one or more CPUs, various amounts of RAM storing computer programs, such as a Web server 130 for accessing information over the Internet and/or Intranets 100, a map server 140 for storing and transmitting vector-based map data, and a common gateway interface (CGI) program 150, and other data, such as map data in a spatial data format (SDF) structure 160 and map data in a relational database management system (RDBMS) 162, and other components typically found in computers. In addition, the client computers 110 and the server computers 130, 140 may include one or more monitors, and fixed or removable data storage devices 126, 160, 162 such as hard disk drives, floppy disk drives, and/or CD-ROM drives. Also included may be input devices such as mouse pointing devices and keyboards.

Both the client computers 110 and the server computers 130, 140 operate under the control of an operating system, such as Windows, Macintosh, UNIX, etc. Furthermore, both the client computers 110 and server computers 130, 140 each execute one or more computer programs 113 under the control of their respective operating systems. The client computers 110 and the server computers 130, 140 interact via the Internet 100.

Generally, the computer programs implementing the present invention are tangibly embodied in a computer-readable medium, e.g., one or more of the fixed and/or removable data storage devices 126, 160, 162 attached to the computers. For example, at the client computers, under control of the operating system, the computer programs 113 may be loaded from the data storage devices 126 into the RAM of a computer for subsequent execution by the CPU 112. The computer programs comprise instructions which, when run and executed by the computer, causes the computer to perform the steps necessary to execute the steps or elements of the present invention. Those skilled in the art will recognize that the exemplary environment illustrated in FIG. 1 is not intended to limit the present invention. Indeed, those skilled in the art will recognize that other alternative hardware environments may be used without departing from the scope of the present invention.

The map server 140 works in conjunction with the map author 120 and the map viewer 118. The map author 120 is used to create, modify, and electronically publish map window files (.mwf files) 122 that define map pictures. After a user creates map window files using the map author 120, the user uses the map author 120 to save the map window files 122, for example, at the Web server 130.

The map viewer 118 enables a user at a client computer to view map pictures and their associated data. The map viewer 118 is currently embodied as a Netscape Navigator browser 114 plug-in. The Netscape Navigator browser 114 interfaces with the Internet and Intranets through the Web browser 116. When a user attempts to open a map window file, the Netscape Navigator browser 114 automatically invokes the map viewer 118. The map viewer downloads a map window file from the Web server 130 and stores the map window file in a data storage device 126. The map window file contains map definition information that identifies map data and the map servers from which the map viewer is to obtain the map data to render and display the map picture. The map viewer 118 makes requests for map data from map servers 140 via a Web server 130 and a Web browser 116 using the communications infrastructure of the Internet and/or one or more Intranets 100.

When the map viewer 118 requests map data from the map server 140, the map server retrieves the map data from either the SDF file storage 160 or from the relational database 162 through an open database connectivity (ODBC) connection 170. The map server returns the requested map data to the map viewer 118.

Vector-Based Data

Figure 2:
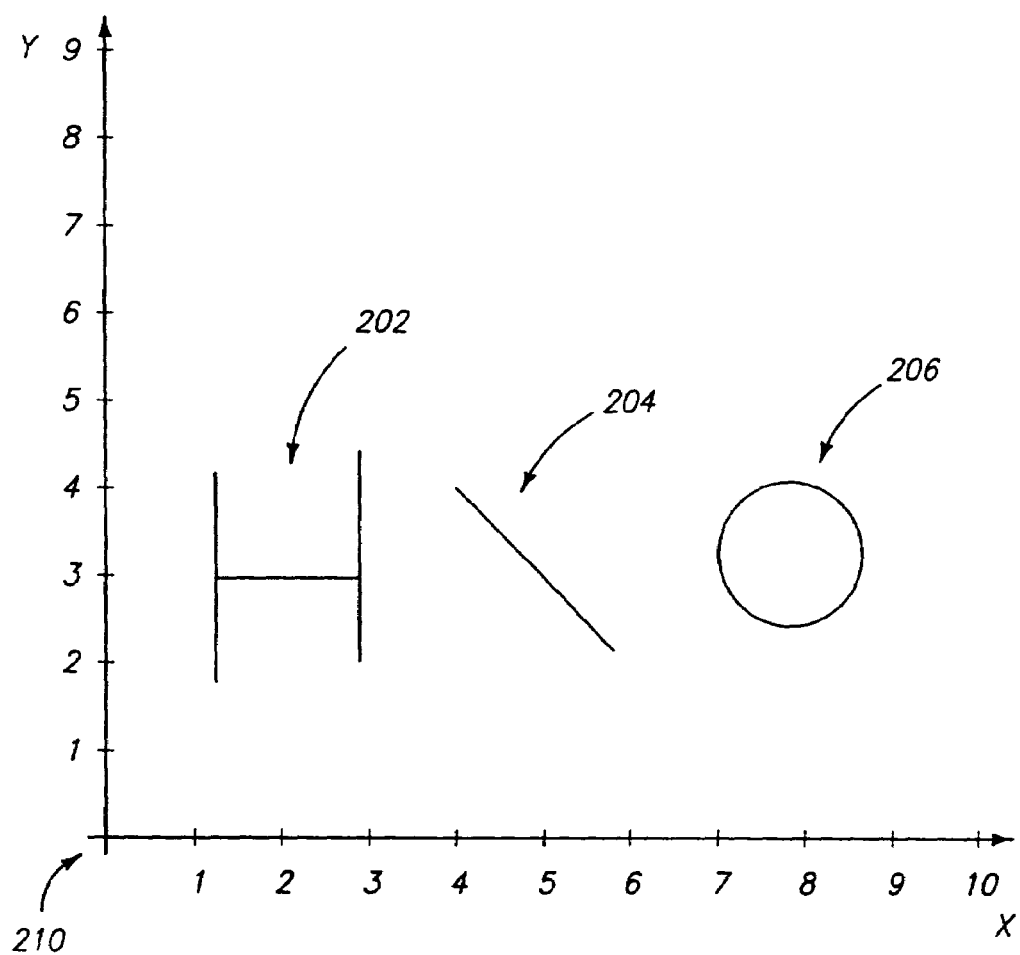
FIG. 2 is a diagram illustrating an image that could be displayed on the monitor using vector-based geographical data.

FIG. 2 is a diagram illustrating an image that could be displayed on the monitor using vector-based geographical data. Objects 202, 204, and 206 are shown in two-dimensional space, represented by the X-Y plane 210. Those skilled in the art will recognize that the X-Y plane is shown in FIG. 2 for illustration only, and generally is not displayed on the monitor with the object. The objects 202, 204, and 206 are represented by one or more primitive or coded entries stored in a buffer. For example, object 204 is identified as a line with end coordinates (X1,Y1) and (X2,Y2) for the line. Object 206 is defined by a point and a radius. Other objects are comprised of other primitives, such as triangles, circles, arcs, or other objects.

Map definition information defining map pictures using vector-based data is saved in map window files 122 on the Web server 130. The map viewer 118 uses the map window file 122 to identify the location of map data on map servers 140 for use in generating the map pictures. This map data is communicated from the map server 140 to the map viewer 118 using the services of a Web server 130 and Web browser 116. Following installation of the present invention, the Netscape Navigator browser 114 recognizes the map window file 122 as a file that requires the Netscape Navigator browser 114 to automatically load the map viewer plug-in 118 to read the file. The map 118 viewer downloads the map window file 122 to the data storage device 126.

Figure 3:
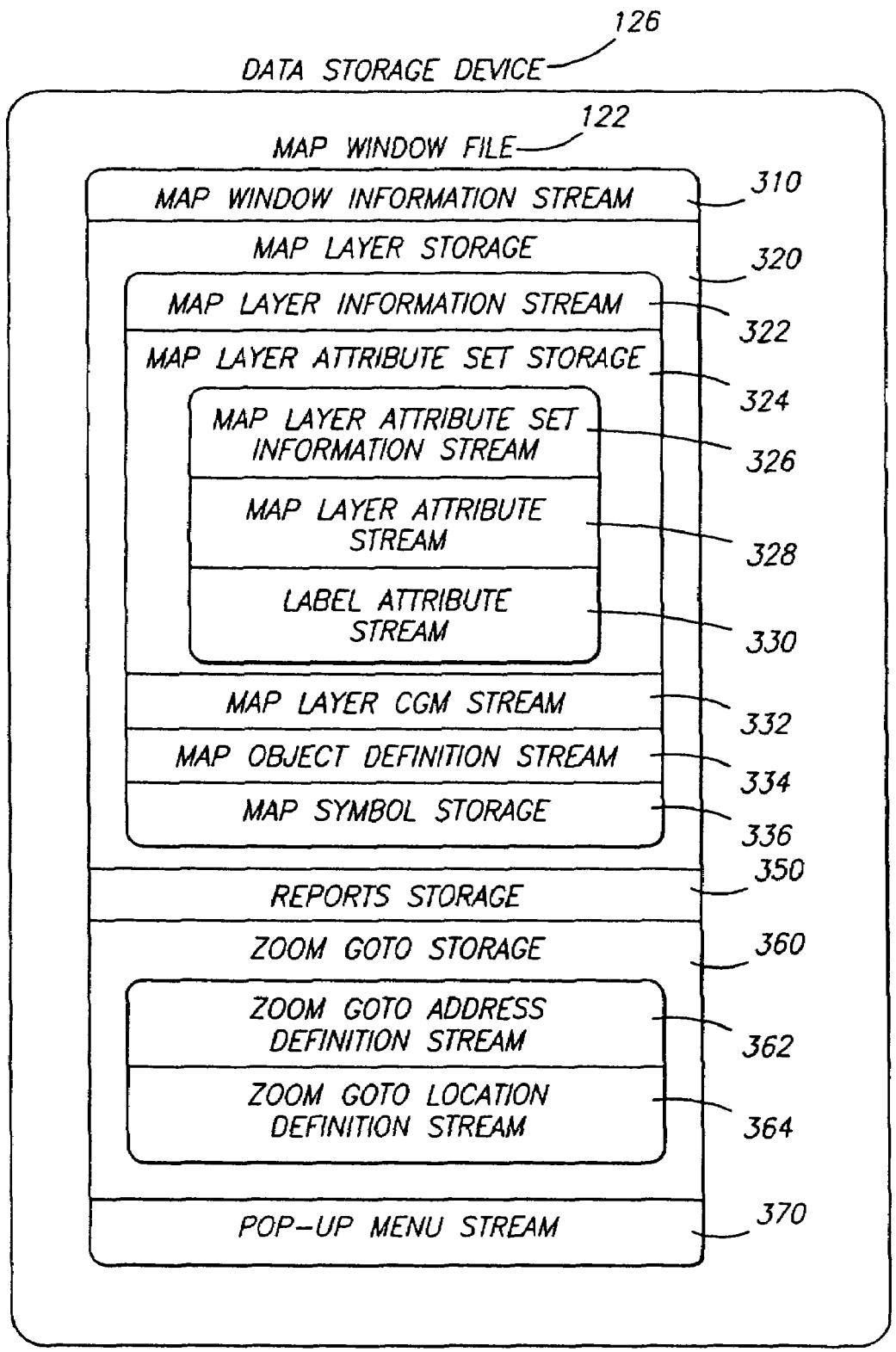
FIG. 3 illustrates the structure of a map window file.

FIG. 3 illustrates the structure of the map window file. In FIG. 3, the map window file 122 is stored on the data storage device 126. The map window file is a self-contained, portable map definition. The map window file describes the map picture and contains the information required to generate and display the map picture. In particular, the map window file contains map definition information including a map window information stream 310, a map layer storage 320, a reports storage 350, a zoom goto storage 360, and a pop-up menu stream 370.

The map window information stream 310 contains information that describes the map window, such as the map window name, color attributes, and line styles. The Map Window Information Stream Table in Appendix A provides a list of the information provided by the map window information stream 310.

The map window file 122 can contain one or more map layer storages 320. Each map layer storage 320 contains information about a map layer, including a map layer information stream 322, a map layer attribute set storage 324, an optional map layer CGM stream 332, a map object definition stream 334, and a map symbol storage 336. The map layer information stream 322 describes the map layer by specifying information such as whether the map layer is static or dynamic. The map layer is static when the map data for the map layer is contained in the map window file 122, and the map layer is dynamic when a location identifier identifying the location of the map layer is contained in the map window file 122.

Additionally, the map layer storage 320 can contain one or more map layer attribute set storages 324. The map layer attribute set storage 324 contains the attributes used to display the map objects making up the map layer at a particular scale. In particular, the map layer attribute set storage 324 contains a map layer attribute set information stream 326, one or more layer attribute streams 328, and one or more label attribute streams 330. The map layer attribute set information stream 326 contains information that describes the attributes contained in the map layer attribute set storage 324. The map layer attribute streams 328 contain information about particular attributes for each type of map object (e.g., marker, text, polyline, or polygon). The map label attribute streams 330 contains label attribute information for the following map objects: marker, polyline, or polygon.

The map layer CGM stream 332 of the map layer storage 320 contains a computer graphic metafile for the map layer. All static map layers are saved as computer graphic metafiles embedded within the map window file 122. The map object definition stream 334 of the map layer storage 320 contains the definition of the map object upon which the map layer is based. The map symbol storage 336 of the map layer storage 320 contains one or more symbol definition streams that contain the definitions of symbols used in the map picture. The Map Layer Storage Table in Appendix B provides a detailed list of the information contained in the map layer storage 320.

The reports storage 350 contains one or more report definition streams that contain the definitions of reports that can be generated using computer programs that can be purchased and stored at the Web server 130. The Report Definition Stream Table in Appendix C provides a detailed list of the information contained in the report definition stream. The zoom goto storage 360 provides the categories of areas to which a user can zoom using the zoom goto command. In particular, the zoom goto storage 360 contains one or more zoom goto address definition streams 362 that contain the definition of an address to which a user can zoom and one or more zoom goto location definition streams 364 that contain the location to which a user can zoom. The Zoom Goto Storage Table in Appendix D provides a detailed list of the information contained in the zoom goto storage 360. The popup menu stream 370 contains the definition of a popup menu that can be displayed over the map picture. The Popup Menu Stream Table provides in Appendix E provides a detailed list of the information contained in the popup menu stream 370.

Updates to the map server can be updated with the distribution of one map window file. The map window file can be saved locally, or distributed to other hosts or users to be copied, modified, re-used and/or embedded within other web pages. The map window files identify map layer files. These map layer files are stand-alone map layer definitions that are portable and exportable. Moreover, map layer files enable users to build and maintain libraries of map layers that can be used internally to build map pictures quickly, or provided to business partners, vendors, or clients for use in authoring efforts.

The Map Author

Figures 4, 5:
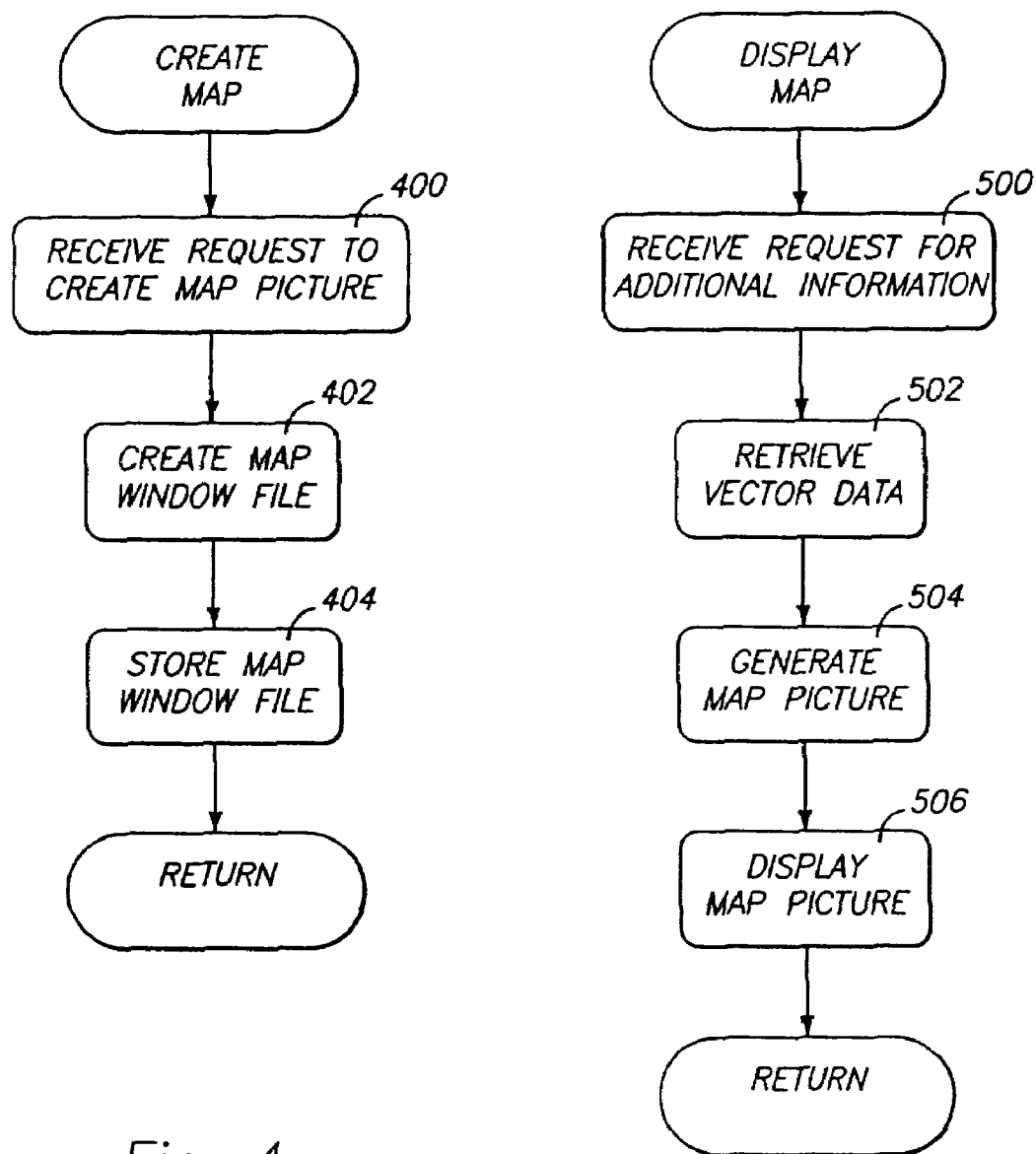
FIG. 4 is a flow diagram illustrating the general logic of the map author.
FIG. 5 is a flow diagram illustrating the general logic of the map viewer after an initial map picture is displayed.

The map author 120 is used to define, modify, and electronically publish map pictures. In particular, the map author 120 enables a user to create a map window file containing map definition information that identifies map data and the map servers from which this map data can be obtained by the map viewer. FIG. 4 is a flow diagram that illustrates the general logic of the map author 120. Block 400 represents the receipt by the map author 120 of a request from a user of a computer to create or modify a map picture. Upon receipt of the user's request, the map author 120 enables a user to define a map picture having map objects, multiple layers, and other features, which are discussed below.

The map author 120 allows for remote authoring. The map author 120 enables authoring map pictures over the Internet or over Intranets 100 for publishing from a map server 140 at a different location. For example, a business user who wants to use a geographic information system for the business on a daily basis, but who does not want to enter into the significant costs associated with maintaining an in-house geographic information system database, can have a vendor maintain the geographic information system. However, the user could use the map author 120 to retain full control over published map pictures, even though they are served from a remote map server 140 over the Internet or Intranets 100.

In particular, Block 402 illustrates that a map window file is created that defines a map picture. When creating or modifying a map window file, the map author 120 enables the setting of map display properties as well as the setting of the level of interaction within a map, allowing the user of the map author 120 to see the map pictures as an end-user will, as they are being created. Additionally, with an interactive legend, the map layers defined in the map are available with control over data source definitions, thematic mapping settings, symbol, line style, and polygon flood/fill settings, as well as visibility by scale control and dynamic/static layer definition.

The map author 120 also enables editing of published map properties, including extents, colors, menus (e.g., pop-up menus), zoom navigation capabilities, map picture width and scale, and map layer properties (e.g., visibility by scale and rendering attributes).

Moreover, the map author 120 includes the following features: a view distance feature that enables setting the distance between any two points on the map picture, enabling multiple map objects to be chosen by map object list or spatial techniques (e.g., radius or polygon), map bookmarking, intelligent map caching, multiple attributes by scale per layer, multiple document interface (MDI) and multiple map editing, customized reports associated with map objects, TrueType font support, constant sized text, user defined symbols, constant sized symbols, and automatic labeling of features with over-posting resolution.

The map author 120 also has an attributes by scale feature that allows the setting of multiple attributes for a specific layer based on the layer scale. By using the attributes by scale feature, the map author 120 provides a richer looking map picture that appears to change as the end-user zooms in to view greater levels of detail and that avoids redundant data retrieval from the server. The map author 120 allows control over map object labeling, including multiple settings to resolve over-posting problems at run-time.

The map author 120 enables a user to define a map picture using map objects with attached URL links. The map author's 120 distributed mapping enables viewing map pictures that are being drawn and refreshed from more than one map data source. For example, the map author 120 allows a user to create map pictures that have property boundaries from a municipal database over-laid on top of contours and elevations being served from a government agency database.

The map author 120 enables a user to define a map layer by specifying the objects for that map layer and indicating that attributes, such as the color of the objects, are to be obtained from a specified database. When the map viewer reads this information in the map window file, the map viewer 118 obtains the attribute data via the map server 140. In particular, the map server 140 handles many types of attribute data by connecting directly to the attribute data in its native format when linking to any open database connectivity (ODBC) database which has an ODBC driver. Therefore, the user does not need to convert the attribute data in these databases to any particular format.

Block 404 illustrates that the map author 120 stores the map window file, for example on the Web server 130. The map author 120 can connect to multiple Web servers 130. Therefore, the map author 120 enables a user to store the map window file on one or more Web servers 130.

Additionally, while defining a map picture, the user is able to access multiple map servers 140 for map data. The map author 120 allows a user to specify data that is in various formats. Then, when the map viewer 118 reads the map window file defining the map picture, the map viewer 118 requests the map data from the map server 140. The map server 140 retrieves the specified data for the map viewer 118, and a spatial data converter converts data formats for Geographic Information System data or Desktop Mapping data into spatial data format. Currently supported file formats include ASCII, Atlas BNA, AutoDesk DXF, ESRI ArcView Shapefiles, and MapInfo Interchange (map information data format (MID) or map information interchange format (MIF)) files.

Map window files created using the map author 120 are made available to Internet and/or Intranet 100 users by saving and publishing them using the File Save command in the map author 120. When a map is published, it is saved to a map window file (with the file extension .mwf) within the Web server directory hierarchy. The map window file has a URL so that it can be accessed by Internet and/or Intranet 100 users with the map viewer 118.

Individuals using a map viewer 118 can access published map pictures by accessing the Web site where the map window file defining the map picture is stored. The URLs for map pictures on a Web site can be made available from a HTML (Hypertext Markup Language) Home Page. A map picture can also be embedded within a Web page. When the URL for a map picture is placed into a Web browser 116, the map picture is displayed in the Web browser's 116 user interface.

Map window files can be password protected so that particular users can open and modify them. Additionally, map window files can be made available to particular users for viewing.

Although the map author 120 is typically used in conjunction with the map server 140, in one embodiment of the present invention, the map author 120 can be used independently to create map window files that contain static map layers (i.e., map layers which can be viewed without accessing the map server). The map server 140 is used to add user-defined data to map pictures and to publish map pictures on the Web.

Including Links to Map Pictures

Using the map author 120, a user create map window files that identify map objects which have links to other information, including map pictures from web pages. When linking to a map picture from a web page, a user determines whether the map picture is displayed on the entire computer screen or within a window of a browser. A user can also create map window files that identify map objects which have links to map pictures embedded in HTML documents, and these map pictures can be displayed.

Creating a link to a map picture from a HTML document is no different then creating a link to any other web document. It is dependent on the HTML anchor (<A>) tag. The following steps indicate how the HTML anchor is created:

1. Begin the anchor with: <A.
2. Specify the name of the map to link to with the parameter HREF="mapname.mwf".
3. Enter to name of the map/link to display in the document.
4. End the anchor tag with: </A>For example: <A HREF="http://www.mapguide.com/map pictures/usa.mwf">UnitedStatesMap</A>.

This entry makes the words "United States Map" link to a map called usa.mwf. When a user selects this text through a browser, the map viewer 118 plug-in will display the US map in the current window.

Additionally, a user can specify that the map picture be displayed in a different window. This is done by adding a Target parameter inside the anchor tag. For example: <A HREF="http://www.mapguide.com/mappictures/usa.mwf"TARGET="MAPAREA">UnitedStatesMap</A>. This entry would display the map picture in a browser window called MAPAREA. If the window was not already opened, a new window would be opened. The target parameter can also reference the name of a frame instead of a window.

A user can specify that a map be displayed already zoomed in to a portion of the map picture in the following manner:

1. Zoom in on the area using the map viewer 119.
2. Select the Copy as Bookmark command from the Copy menu to copy the map URL to the clipboard. This URL will include the name of the map and URL parameters that tell the map viewer 119 to zoom to that area.
3. Paste this URL into the HREF parameter of the anchor tag. For example: <A HREF="http://www.mapguide.com/mappictures/usa.mwf#Lat=37.81&Lon=-122.37&Width=20.0&Units=Mi">UnitedStatesMap</A>. This entry would display a map of the San Francisco area.

Moreover a map picture can be embedded in an HTML document using the following steps:

1. Begin the embed tag with: <EMBED>.
2. Specify the name of the map to link to with the parameter SRC="mapname.mwf".
3. Specify the width and height of the map in pixels with the WIDTH=NNN and HEIGHT=NNN parameters.
4. End the embed tag with: >

For example: <EMBED SRC="http://www.mapguide.com/mappictures/usa.mwf"WIDTH=300HEIGHT=200>. This entry displays a map of the US in the current document. The map picture is 300×200 pixels in size.

When the map viewer 118 displays a map picture by using a Uniform Resource Locator (URL) link, a number of parameters can be added to the URL link to change the way the map picture looks and customize the behavior of the map viewer 118. The format of a Map Window URL and optional parameters are displayed in the URL Tables in attached Appendix F. Default values for the parameters are shown in bold in the URL Tables.

Additionally, when a user moves a mouse over the map picture, if the cursor is pointing to a map object with an associated URL, the cursor appears in the shape of a hand. If the user chooses the map object by double clicking on the map object, the map viewer 118 follows the link provided by the uniform resource locator and displays the linked information.

The Map Server

The map server 140 works in conjunction with the map author 120 and the map viewer 118. In particular, when a user creates map window files that define map pictures using the map author 120, the map author 120 forwards the map window files to the Web server for storage. Then, when a user using a map viewer 118 wishes to view map pictures, the map viewer 118 reads the map window file to determine from which map servers 140 to obtain vector-based map data and generates map pictures.

The map server 140 is a scaleable, fault tolerant, 32-bit, multi-threaded software application that serves map data in response to requests from the map viewer 118. The map server 140 is scaleable, allowing hardware to be up-scaled for increased performance or to support additional users. Moreover, the map server 140 uses remote procedure calls (RPCs) to support multiple map servers 140 and utilizes the CGI program 150 to interface with web servers 130, including the Netscape API interface to integrate with Netscape's Communications or Commerce server. This allows the service to be scaled up with computing power to support large numbers of on-line users.

The map server 140 is designed to be fault tolerant and includes features such as a self re-start mechanism support 24 hours of operation for the server. Additionally, in order to provide full administrative auditing of the site, performance, and history, the map server 140 generates multiple log files which can be used for auditing of usage, processing of statistics, and daily monitoring of system functions.

The map server 140 supports simultaneous connections to multiple geographic files and multiple databases, including relational databases resident locally or residing under UNIX operating systems on workstations accessible on the network. The map server 140 is easily integrated with other processes to retrieve map-based information and supports on-line additions to published map content. It integrates easily with existing Web sites and is easy to configure and manage.

The map server 140 software consists of three components. The MapAgent component receives requests for map data, and queues these requests as they are received. The MapAgent component then distributes the queued requests to the map servers 140 that are installed and running. This allows for scaleable performance and multi-processing. The Administrator component provides control for configuring resource security, log file generation, data source directories and database access, integration with the Web server 130, and service start or stop. The Service component processes the requests for map data. Therefore, in a hybrid network environment, users can realize the advantages of the Internet and/or Intranets 100 and still maintain data security. The number of users or hits on a server is determined by the Hypertext Transport Protocol (HTTP) Web server. The map server 140 can disseminate map-based information to multiple users.

If a user has map data (data necessary for constructing map pictures), the map data is converted into map SDF files and submitted to the map server 140 for storage or transmission. Map data in any of the leading Geographic Information System or Desktop Mapping formats can be converted into map SDF files using conversion utilities. Attribute data, which provides more information about items on the map, can be stored in a separate database. The attribute data is linked to the map data when a user uses the map author 120 to create map window files that define map pictures.

The map server 140 is used to disseminate map data to Internet and Intranet 100 users. Users can define map pictures using a variety of data and can choose how often to update portions of the data by creating map window files.

The Map Viewer

The map viewer 118 enables a user at a client computer to view map pictures and their associated data. The map viewer 118 provides data about a subject in a geographic format. For example, when a user looks at information through map pictures the user can see patterns and trends that are not apparent when looking at information through text. In particular, when the user reviews real estate listings using the map viewer 118, the user can see the price of a home relative to the prices of other homes in the neighborhood. The user can also see where the home is relative to schools and parks. Depending on the information contained for the map picture, the user may also be able to view different map layers, such as map layers containing municipal zoning information or demographic information.

FIG. 5 is a flow diagram that illustrates the general logic of the map viewer 118. The map viewer 118 is currently embodied as a Netscape Navigator browser plug-in. When a user attempts to open a map window file, the Netscape Navigator browser automatically invokes the map viewer 118 to render and display the vector-based map data contained in the map window file. The map viewer 118 makes requests for map data from map servers 140 using the communications infrastructure of the Internet and/or one or more Intranets 100 for display or printing. In particular, when the map viewer is invoked, the map viewer downloads the map window file 122. The map viewer then reads the map window file to identify the map data for the initial map picture. Next, the map viewer generates and displays the initial map picture.

Block 500 represents the map viewer 118 receiving a request to display the map picture with additional information. Block 502 represents the map viewer 118 retrieving vector-based geographical data from the map server 140 specified in the map window file 122. In particular, the map viewer 118 can access published map pictures, which are saved in map window files on the Web server 130. While reading a map window file, the map viewer 118 requests map data from the map server 140 using the services of a Web server 130 and Web browser 116.

Block 504 represents the map viewer 118 generating a map picture with the retrieved vector-based data. The map viewer 118 uses the information in the map window file to display the map picture and to configure the map viewer 118 (i.e., the user interface provided by the map viewer 118). Block 506 represents the map viewer 118 displaying the generated map picture. Once a map viewer 118 has loaded a map window file, the map viewer 118 is able to display the map picture and respond to the user's various requests, for example requests to execute a zoom command or choose a map object to view additional information. Based on the actions of the end-user, the map viewer 118 makes requests to a map server 140 for additional map data or other information as required. This lowers the processing burden on the map server 140, increasing performance and leveraging the power of the client computer running the map viewer 118.

Moreover, the map viewer 118 provides an interactive legend for layer control. The map viewer 118 enables a user to zoom to a particular width and scale of the map picture. A viewer can also zoom in on portions of the map picture. The map viewer 118 also enables a user to view the distance between two points on the map picture and perform editing functions, such as copying portions of the map to a clipboard. Moreover, the map viewer 118 supports map bookmarking and connections to multiple servers.

The map viewer 118 maintains multi-layer map object and graphic object information in structured files in memory and manages the user interface. The map window file, and all other information transferred between the map server 140 and the map viewer 118, is compressed and encrypted to enhance performance and maintain security. In addition, the map viewer 118 caches map data to eliminate redundant data transfer between the map viewer 118 and the map server 140.

While the installation of some Geographic Information Systems or Desktop Mapping systems require the installation of over 1000 files, which occupies a large amount of disk space, the map viewer 118 typically requires the installation of one file (the map viewer 118 "dll" file), making support, problem solving, and program updates fast, simple, inexpensive, and easy to perform from remote sites.

Figure 6:
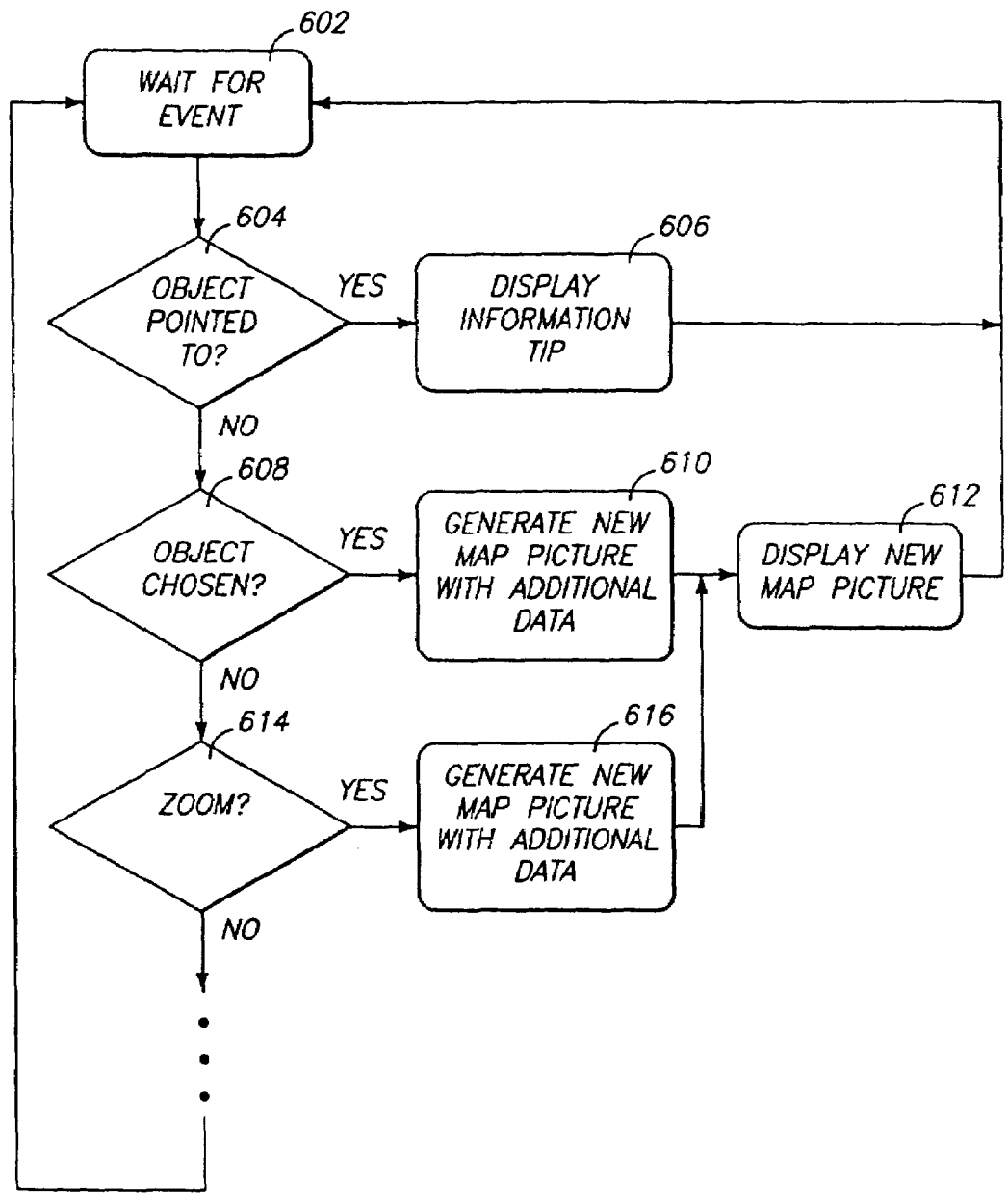
FIG. 6 is a flow diagram illustrating the logic of the map viewer's response to specific requests from the user.

FIG. 6 is a flow diagram illustrating the logic of the map viewer's 118 response to requests from the user. Block 602 represents the map viewer 118 waiting to receive an event indicating a request from the user. Block 604 is a decision block that represents the map viewer 118 determining whether the event indicates that a map object is pointed to. Block 606 represents that when a map object is pointed to, the map viewer 118 displays information about that map object.

As a user moves a mouse cursor over map objects in the map picture, information about the map object, such as the name of the map object, is displayed in a yellow MapTip window. The name of each map object and the layer that it is on are also displayed in the status bar on map pictures that have the status bar displayed. The map object name might be the State on the layer of US States or it might be the Zip Code on the layer showing zip codes.

Block 608 is a decision block representing that the map viewer 118 is determining whether the event indicates that a map object has been chosen. Individual map objects are chosen by pointing at the map object using a mouse and double clicking the mouse button. When new map objects are chosen, any map objects that were previously chosen will no longer be chosen. A map object can be added to the group of previously chosen map objects by holding the <SHIFT> key while choosing the map object.

The map viewer 118 provides several methods for choosing multiple map objects. This is useful to display further information about the chosen map objects using the view reports command from the menu bar. The map viewer 118 displays the number and type of chosen map objects in the status bar at the bottom of the map.

In particular, a group of map objects can be chosen by spatial techniques, such as enclosing the map objects in a rectangle or a circle or a polygon. Moreover, map objects can be chosen by name using a command from the menu bar. Invoking this command provides a dialog box that identifies the map layers and the names of the map objects in each layer. The clear command on the menu bar enables a user to remove a map object from the group of chosen map objects.

Block 610 represents that the map viewer 118 generates a new map picture with additional map data once when a map object has been chosen. Moreover, Block 612 represents the map viewer 119 displaying the new map picture.

Block 614 is a decision block representing that the map viewer 118 is determining whether the event indicates the zoom command. The map viewer 118 provides several navigation methods, including opening map pictures, panning, and zooming portions of a map picture.

Zooming allows a user to easily change the map to either view an area with greater resolution or obtain additional information about the area. Moreover, when a user wishes to view an area with greater resolution, because the map picture is generated with vector-based data that has already been downloaded, the present invention is able to immediately generate a new map picture with the resolution requested using the vector-based data. In the prior art systems which use raster data to generate map pictures, when a user wishes to view an area with greater resolution, the prior art systems download raster data for a new map picture having the requested resolution.

Several types of zoom commands are available. A user can choose to zoom in by a factor of two by choosing the zoom command from the menu bar, by using the mouse cursor to choose a point around which to zoom, and then clicking the mouse button. A user can zoom in to a rectangular area by choosing the zoom command from the menu bar and by using the mouse cursor to select a rectangular area on the map picture. A user can also zoom to a particular width by choosing the zoom width command from the menu bar and entering a width (in miles or kilometers) that will represent the width of the area displayed in the map window. A user can zoom to a scale by choosing the zoom scale command from the menu bar and entering a scale, such as 1:1000. Additionally, a user can zoom in to a place, address, or zip code using the zoom goto command from the menu bar, selecting one of these three categories, and entering the name of the location to be zoomed to. Moreover, a user can zoom to selected map objects, can go back to a previous zoom level, or zoom so that the entire map picture is displayed in the window. A map object can be selected by being pointed to with a mouse and single clicking the mouse button. Block 616 represents the map viewer 118 generating a new map picture based on the zoom command.

The ellipses in FIG. 6 indicate that other events can be received by the map viewer 118. For example, the user may enter a request to open a map picture by choosing the File Open Location menu command from the browser's menu bar to display the Open Location dialog or to enter the URL of the map that that is to be opened. Additionally, a user can request to pan the map picture. Panning allows a user to adjust a map to show a nearby area. That is, when a portion of a map picture is displayed in a window, a user can reposition the map picture within the window to see different portions.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX A

Map Window File Table

Map Window Information Stream

| Item | Type | Description |
| --- | --- | --- |
| Version | STR | "2.0.1" |
| MapName | STR | Map window name. (48) |
| MapScale | FP32 | Initial Map Display Scale. Initially this value will be ignored. |
| BakClr | UI16 | Background color |
| ExtType | UI16 | Map Center Type.<br>= 1; Lat/Lon values. Always used internally except for<br>= 5; User defined meters. |
| MapCenX | FP64 | Center of Map: X coordinate, Longitude |
| MapCenY | FP64 | Center of Map: Y coordinate, Latitude |
| MapWidth | FP64 | Width of Map: meters |
| MapHeight | FP64 | Height of Map: meters |
| PCATN | STR | Projection Category Name. (64) |
| PNAME | STR | Projection Name. (64) |
| PROJTNT | UI16 | Projection Type<br>= 1; Transverse Mercator<br>...<br>101; LatLon<br>201; User defined |
| PELIPT | UI16 | Projection ellipsoid type |
| PDATUM | UI16 | Projection datum number (pdatum) |
| PLAT0 | FP64 | Projection latitude of origin (lat0) |
| PLAT1 | FP64 | Projection 1'st standard parallel (lat1) |
| PLAT2 | FP64 | Projection 2'nd standard parallel (lat2) |
| PLON0 | FP64 | Projection longitude of origin/central meridian (lon0) |
| PLON1 | FP64 | Projection 1'st standard longitude. (lon1) |
| PLON2 | FP64 | Projection 2'nd standard longitude. (lon2) |
| PSCF | FP64 | Projection scale factor (k0) |
| PAZI | FP64 | Projection azimuth (azimuth) |
| PFE | FP64 | Projection false easting (false_east) |
| PFN | FP64 | Projection false northing (false_north) |
| PUNIT | FP64 | = 1.0; for 1 meter/meter<br>= factor; (units/meter) for user defined projections. |
| PASSWD | STR | Password to protect this map window. Encrypted. Added in version "2.0.1" Encrypted in version "2.0.2" |
| AKEY | STR | Access key. Encrypted. Added in version "2.0.2" |

APPENDIX B

Map Layer Storage Tables

Map Layer Information Stream

| Item | Type | Description |
| --- | --- | --- |
| Version | STR | "2.0" |
| LayerName | STR | Map layer name. |
| AccessControl | BOOL | Access control flag. If enabled, a user/password pair should be submitted with the map layer request to the map server. |
| AKey | STR | Access key. Encrypted. Renamed and used in version "2.0.1" |
| Statik | BOOL | Specifies if the map layer is static or dynamic |
| Visi | BOOL | Specifies if the map layer is potentially visible |

-continued

| Item | Type | Description |
|---|---|---|
| VisType | UI16 | Visibility Type<br>= 0; Always visible<br>= 1; Visible by scale<br>= 2; Visible by width |
| Pick | BOOL | Specifies if the map layer is pickable |
| Edit | BOOL | Specifies if the map layer is editable |
| Hide | BOOL | Specifies if the map layer should be hidden from the legend. |
| Priority | FP64 | Specifies the priority of the map layer (0.0 to 100.0) |
| RealTime | BOOL | Specifies if the map layer should update itself in realtime |
| RTSecs | U132 | Specifies update time interval in seconds. |

Map Layer Attribute Set Information Stream

| Item | Type | Description |
|---|---|---|
| Version | STR | "2.0" |
| VisMin | FP64 | Minimum scale/width at which map layer is visible with attributes |
| VisMax | FP64 | Maximum scale/width at which map layer is visible with attributes |
| ConstSize | BOOL | Specifies if objects are constant sized. |
| ThemeType | UI16 | Type of themes<br>= 0; None<br>= 1; Range of values<br>= 2; Individual values<br>If themes are defined, then the order of the themes can be determined by the names of the Map Layer Attribute streams. |
| ThemeDataSrc | STR | Name of the ODBC data source for themes |
| ThemeTblName | STR | Name of the table containing the theme value |
| ThemeKeyCol | STR | Name of the column that contains the map object key |
| ThemeKeyColType | UI16 | Data type of the key column. Standard Core ODBC data types from SQL.H<br>= SQL_CHAR (1)<br>= SQL_NUMERIC (2)<br>= SQL_DECIMAL (3)<br>= SQL_INTEGER (4)<br>= SQL_SMALLINT (5)<br>= SQL_FLOAT (6)<br>= SQL_REAL (7)<br>= SQL_DOUBLE (8)<br>= SQL_DATE (9)<br>= SQL_TIME (10)<br>= SQL_TIMESTAMP (11)<br>= SQL_VARCHAR (12) |
| ThemeCol | STR | Name of the column that contains the theme value |
| ThemeColType | UI16 | Data type of the theme column. Standard ODBC data types from SQL.H and Date/Time/Timestamp<br>= SQL_CHAR (1)<br>= SQL_NUMERIC (2)<br>= SQL_DECIMAL (3)<br>= SQL_INTEGER (4)<br>= SQL_SMALLINT (5)<br>= SQL_FLOAT (6)<br>= SQL_REAL (7)<br>= SQL_DOUBLE (8)<br>= SQL_DATE (9)<br>= SQL_TIME (10)<br>= SQL_TIMESTAMP (11)<br>= SQL_VARCHAR (12) |

Marker Map Layer Attribute Stream

| Item | Type | Description |
|---|---|---|
| Version | STR | "2.01" |
| SymbolName | STR | Specifies the name of the symbol: FileName.smb\tSymbolName |
| SymbolSize | FP32 | Specifies the size of the symbol |
| UseSymbolAttrs | BOOL | Specifies whether or not to use the attributes in the symbol definition |
| TextColor | UI16 | Specifies the override text color index |
| LineColor | UI16 | Specifies the override line color index |
| EdgeColor | UI16 | Specifies the override edge color index |
| FillColor | UI16 | Specifies the override fill color index |
| ThemVal1 | STR | For ThemeType = Range of Values: Minimum value<br>For ThemeType = Individual Values: The value |
| ThemVal2 | STR | For ThemeType = Range of Values: Maximum value |
| ThemeLabel | STR | Label to display in the legend when themed. |

Text Map Layer Attribute Stream

| Item | Type | Description |
|---|---|---|
| Version | STR | "2.0" |
| TypeFace | STR | Specifies the font typeface name |
| Weight | UI16 | Specifies the font weight |
| Italic | BOOL | Specifies whether or not the font is italicized. |
| Height | FP32 | Specifies the character height |
| TextColor | UI16 | Specifies the text color index |
| BkMode | UI16 | Specifies the text background mode (opaque, transparent) |
| BkColor | UI16 | Specifies the text background color index |
| HorzAlign | UI16 | Specifies the horizontal text alignment |
| VertAlign | UI16 | Specifies the vertical text alignment |
| ThemVal1 | STR | For ThemeType = Range of Values: Minimum value<br>For ThemeType = Individual Values: The value |
| ThemVal2 | STR | For ThemeType = Range of Values: Maximum value |

Polyline Map Layer Attribute Stream

| Item | Type | Description |
|---|---|---|
| Version | STR | "2.01" |
| LineStyle | UI16 | Specifies the line style index |
| LineColor | UI16 | Specifies the line color index |
| LineThickness | UI16 | Specifies the line thickness in thousandths of inches |
| ThemVal1 | STR | For ThemeType = Range of Values: Minimum value<br>For ThemeType Individual Values: The value |
| ThemVal2 | STR | For ThemeType = Range of Values: Maximum value |
| ThemeLabel | STR | Label to display in the legend when themed. |

Polygon Map Layer Attribute Stream

| Item | Type | Description |
|---|---|---|
| Version | STR | "2.01" |
| FillStyle | UI16 | Specifies the fill style index |
| FillColor | UI16 | Specifies the foreground fill color index |

-continued

| Item | Type | Description |
| --- | --- | --- |
| FillPattern | UI16 | Specifies the fill pattern index (hatch/bitmap fills) |
| BkMode | UI16 | Specifies the background fill mode (hatch/bitmap fills) |
| BkColor | UI16 | Specifies the background color index (hatch/bitmap) fills |
| EdgesVisible | BOOL | Specifies whether or not the polygon edges are visible |
| EdgeStyle | UI16 | Specifies the polygon edge style index |
| EdgeColor | UI16 | Specifies the polygon edge color index |
| EdgeThickness | UI16 | Specifies the edge thickness in thousandths of inches |
| ThemVal1 | STR | For ThemeType = Range of Values: Minimum value<br>For ThemeType Individual Values: The value |
| ThemVal2 | STR | For ThemeType Range of Values: Maximum value |
| ThemeLabel | STR | Label to display in the legend when themed. |

Polyline Label Attribute Stream

| Item | Type | Description |
| --- | --- | --- |
| Version | STR | "2.0" |
| TypeFace | STR | Specifies the font typeface name |
| Weight | UI16 | Specifies the font weight |
| Italic | BOOL | Specifies whether or not the font is italicized. |
| Height | FP32 | Specifies the character height |
| TextColor | UI16 | Specifies the text color index |
| BkMode | UI16 | Specifies the text background mode (opaque, transparent) |
| BkColor | UI16 | Specifies the text background color index |
| ConstSize | BOOL | Specifies whether the labels are constant size. |
| PostingPos | UI16 | Specifies how the labels should be positioned with respect to the polyline object. The allowable posting positions are as follows:<br>0 - post the label above the polyline.<br>1 - post the label on the polyline.<br>2 - post the label below the polyline. |
| MinLength | FP32 | Specifies the minimum polyline length (in meters); polylines shorter than the minimum are not labeled. |

Polygon Label Attribute Stream

| Item | Type | Description |
| --- | --- | --- |
| Version | STR | "2.0" |
| TypeFace | STR | Specifies the font typeface name |
| Weight | UI16 | Specifies the font weight |
| Italic | BOOL | Specifies whether or not the font is italicized. |
| Height | FP32 | Specifies the character height |
| TextColor | UI16 | Specifies the text color index |
| BkMode | UI16 | Specifies the text background mode (opaque, transparent) |
| BkColor | UI16 | Specifies the text background color index |
| ConstSize | BOOL | Specifies whether the labels are constant size. |

Marker Label Attribute Stream

| Item | Type | Description |
| --- | --- | --- |
| Version | STR | "2.0" |
| TypeFace | STR | Specifies the font typeface name |
| Weight | UI16 | Specifies the font weight |
| Italic | BOOL | Specifies whether or not the font is italicized. |
| Height | FP32 | Specifies the character height |
| TextColor | UI16 | Specifies the text color index |
| BkMode | UI16 | Specifies the text background mode (opaque, transparent) |
| BkColor | UI16 | Specifies the text background color index |
| ConstSize | BOOL | Specifies whether the labels are constant size. |
| PostingPos | UI16 | Specifies the preferred position of labels with respect to the extent of the marker object. There are 8 possible positions moving counter-clockwise around the perimeter of the extent, with the lower left-hand corner being at position 0. |

Map Object Definition Stream

| Item | Type | Description |
| --- | --- | --- |
| Version | string | "2.0" |
| ObjectType | UI16 | Type of Object. Enumerated values<br>= 1; Marker<br>= 2; Text<br>= 3; Polyline<br>= 4; Polygon<br>= 10; Drawing Map Object |
| ObjectFrom | UI16 | Source of the data for object. Enumerated values.<br>= 0; None<br>= 1; SQL<br>= 2; SDF |
| LocalSource | BOOL | Specifies if the data source is local. |
| DataSource | STR | Name of data source |
| ObjectTable | STR | Name table |
| NameColumn | STR | Column from obect table for object name |
| KeyColumn | STR | Column from object table for object key |
| LinkColumn | STR | Column from the object table for object URL link |
| LatColumn | STR | Column from the object table for object latitude |
| LonColumn | STR | Column from the object table for object longitude |
| KeyColumnType | UI16 | ODBC Data type of Key column. Standard ODBC data types from SQL.H<br>= SQL_CHAR (1)<br>= SQL_NUMERIC (2)<br>= SQL_DECIMAL (3)<br>= SQL_INTEGER (4)<br>= SQL_SMALLINT (5)<br>= SQL_FLOAT (6)<br>= SQL_REAL (7)<br>= SQL_DOUBLE (8)<br>= SQL_VARCHAR (12) |
| HeightColumn | STR | Column or expression from the object table for text object height in meters |
| AngleColumn | STR | Column or expression from the object table for text object angle in degrees |
| ObjectSdf | STR | Name of the spatial data file. |
| ObjectLinkSql | BOOL | Specifies if the spatial data file is linked to an SQL data source. If the SDF is linked to an SQL data source, DataSource, ObjectTable, KeyColumn, and KeyColumnType must be defined. |

-continued

| Item | Type | Description |
|---|---|---|
| Where | STR | A Where clause if the map layer is based on an SQL or SDF map object. The 'Where' keyword is not included in the clause. All column names should be qualified with the name table refixed to each column name. |
| ServerUrl | STR | The map server URL for this map layer. |

Projection parameters if we support map objects defined in coordinates other then lat/lon

APPENDIX C

Report Definition Stream Table

| Item | Type | Description |
|---|---|---|
| Version | STR | "2.0" |
| RptName | STR | Name of the report. (48) |
| RptUrl | STR | The URL used to invoke the report. (128) |
| RptData | STR | Any data that is posted to the report URL. (128) |
| RptType | UI16 | Type of report.<br>= 0; Send keys of selected map objects.<br>= 1; Digitize a point and send point. |
| MapLayerNumber | UI16 | The number of map layer that this report can base on at the same time.<br>This will be 0 if this report is always available. (RptType =1)<br>This will be at least 1 if this report is only available when objects are selected from this map layer(RptType = 0). |
| MapLayerName | STR | If MapLayerNumber is greater than 0, the name of all the map layers will follow.<br>If MapLayerNumber is equal to 0, this item will be omitted. |
| . | | |
| . | | |
| . | | |
| MapLayerKeyName | STR | If MapLayerNumber is greater than 0, the name of all the map layer keys will follow.<br>If MapLayerNumber is equal to 0, this item will be omitted. |
| . | . | |
| . | . | |
| . | . | |
| Prompt | STR | Prompt string requesting user to select a point(RptType = 1). |

APPENDIX D

Zoom Goto Storage Table

Zoom Goto Address Stream

| Item | Type | Description |
|---|---|---|
| Version | STR | "2.0" |
| Type | UI16 | = 1; US Street Address |
| ServerUrl | STR | The URL of the Map Server to direct this request to. |
| AKey | STR | Access key. Encrypted. Added in version "2.0.1" |

Zoom Goto Location Stream

| Item | Type | Description |
|---|---|---|
| Version | STR | "2.0" |
| Type | UI16 | = 1; Location in SQL Datasource<br>= 2; Location in SDF file. |
| ServerUrl | STR | The URL of the Map Server to direct this request to. |
| Category | STR | A name that describes the category for this zoom goto location definition. These string is listed in a dropdown combo box in the Zoom Goto Location Dialog |
| MaxReturn | UI16 | The maximum number of location matches to return. The Map Server may override this value. |
| SQL | STR | The SQL Select statement that the map server should execute.<br>The Name of the SDF that the server should search. |
| DataSource | STR | The data source that the SQL select statement should be run against. |
| AKey | STR | Access key. Encrypted. Added in version "2.0.1" |

APPENDIX E

Popup Menu Stream Table

| Item | Type | Description |
|---|---|---|
| Version | STR | "2.0" |
| NumItems | UI16 | Number of menu item definitions to follow. |
| Menuitem #1 | | See table below. |
| ... | | |
| Menuitem #N | | See table below. |

Menu Item Definition

| Item | Type | Description |
|---|---|---|
| Name | STR | Name of item to appear in the menu. |
| Type | UI16 | Type of item. Enumerated values:<br>= 0; Menu item<br>= 1; Separator<br>= 2; Begin menu<br>= 3; End menu |
| ActionId | UI16 | The action to be performed when the menu item is selected.<br>= ACTION_PAN<br>= ACTION_GETPOINTSEND(<URL>)<br>ACTION_SENDSELOBJKEYS(<URL>,<LAYER>)<br>= ACTION_REBUILDLAYER(<LAYER>)<br>= ACTION_OPENMAP(<URL>)<br>= ACTION URL(<URL>) |
| ActionArgs | STR | Arguments that may be required for some of the actions. Swing arguments should be enclosed in double quotes. Multiple arguments should be separated by commas. |

APPENDIX F

URL Tables

FormatURL [?Options][#Anchor]

Option Parameters

| Parameter | Description |
|---|---|
| StatusBar | Specifies if status bar is displayed. [On | Off] |
| LayersViewWidth | Specifies the width of the map layer legend in pixels. Default: 150 |
| DefaultTarget* | Specifies the name of the target window where the map viewer will display HTML documents and display URLs referenced in the OpenUrl, and OpenMap actions. These actions can be defined when customizing the popup menu in map author. |
| ObjectLinkTarget* | Specifies the name of the target window where the map viewer will display the URL associated with a map object. |
| ReportTarget* | Specifies the name of the target window where the map viewer will display reports returned from View Report command. |
| ErrorTarget* | Specifies the name of the target window where the map viewer will display the URL. |
| UrlList | Specifies if the map viewer should generate an HTML document that lists the names and links of map objects that have URLs associated with them when map objects are chosen in the map viewer. The HTML document is displayed in the UrlListTarget window. [On | Off] |
| UrlListTarget* | Specifies the name of the target window where the map viewer will display its UnList when map objects are chosen. |
| AutoLinkLayers | Specifies if the plug-in should automatically download and display the URL associated with map objects from the named map layers. The URLs are displayed in the AutoLinkTarget window. |
| AutoLinkTarget* | Specifies the name of the target window where the map viewer will display the URLs downloaded from the AutoLinkLayers. |
| AutoLinkDelay | Specifies the number of seconds before the next URL associated with a map object from an AutoLinkLayer will be displayed in the AutoLinkTarget window. Default value is 20. If 0 seconds is specified as the delay, the automatic timed update feature will be disabled and the AutoLinkTarget window will be updated when the mouse passes over a map object on an AutoLinkLayer. |

*All of the target option parameters also accept the following reserved target names:

| Target Name | Description |
|---|---|
| _blank | Loads the link into a new blank browser window. The window has no name. |
| _parent | Loads the link into the immediate parent of the document that the link is in. |
| _self | Loads the link into the same window that the link was clicked from. |
| _top | Loads the link into the full body of the window that the link was clicked from. |

Anchor Parameters

| Parameter | Description |
|---|---|
| Lat | Latitude of center area to display. Decimal degrees. |
| Lon | Longitude of center of area to display. Decimal degrees. |
| Width | The width of area displayed in the map viewer. |
| Units | Units used to specify width. [MI | KM | M | FT] |

EXAMPLES http://www.mapguide.com/amap.mwf#LAT=−110.0&Lon=43.1&Width=100&Units=mi http://www.mapguide.com/amap.mwf?StatusBar=On&UrlList=On&LayersViewWidth=0&DefaultTarget=MAINAREA#LAT=−110.0&Lon=43.1&Width=100&Units=mi http://www.mapguide.com/amap.mwf?StatusBar=On&UrlList=On&AutoLinkLayers=Billboards&LayersViewWidth=1&DefaultTarget=MAINAREA&UrlListTarget=WEBSITES&AutoLinkTarget=BILLBOARD&AutoLinkDelay=10#LAT=−110.0&Lon=43.1&Width=100&Units=mi

What is claimed is:

1. A method of obtaining a map in a computer graphics program comprising:
    receiving a request for a map picture;
    obtaining a map file in response to the request;
    determining, from the map file, a uniform resource locator (URL) that identifies a storage location of vector based map data, wherein the vector based map data defines one or more map objects of the map picture;
    obtaining the vector based map data from the storage location at the URL, wherein the obtained vector based map data satisfies the request for the map picture; and
    displaying the map picture.

2. The method of claim 1, wherein only the vector based map data required to satisfy the request is obtained.

3. The method of claim 1, wherein the vector based map data is obtained from a map server across a network connection.

4. The method of claim 1, further comprising creating the map file.

5. The method of claim 1, further comprising setting map display properties and a level of interaction.

6. The method of claim 1, wherein the claim steps are performed by a browser plug-in.

7. An apparatus for obtaining a map computer-implemented graphics system comprising:
    (a) a computer;
    (b) an application executing on the computer, wherein the application is configured to:
        (i) receive a request for a map picture;
        (ii) obtain a map file in response to the request;
        (iii) determine, from the map file, a uniform resource locator (URL) that identifies a storage location of vector based map data, wherein the vector based map data defines one or more map objects of the map picture;
        (iv) obtain the vector based map data from the storage location at the URL, wherein the obtained vector based map data satisfies the request for the map picture; and
        (v) display the map picture.

8. The apparatus of claim 7, wherein only the vector based map data required to satisfy the request is obtained.

9. The apparatus of claim 7, wherein the vector based map data is obtained from a map server across a network connection.

10. The apparatus of claim 7, wherein the application is further configured to create the map file.

11. The apparatus of claim 7, wherein the application is further configured to set map display properties and a level of interaction.

12. The apparatus of claim 7, wherein the application comprises a browser plug-in.

13. An article of manufacture comprising a computer program storage device storing instructions that when read and executed by a computer, results in the computer performing a method for obtaining a map on a computer-implemented graphics system, wherein the method comprises:
  receiving a request for a map picture;
  obtaining a map file in response to the request;
  determining, from the map file, a uniform resource locator (URL) that identifies a storage location of vector based map data, wherein the vector based map data defines one or more map objects of the map picture;
  obtaining the vector based map data from the storage location a the URL, wherein the obtained vector based map data satisfies the request for the map picture; and
  display the map picture.

14. The article of manufacture of claim 13, wherein only the vector based map data required to satisfy the request is obtained.

15. The article of manufacture of claim 13, wherein the vector based map data is obtained from a map server across a network connection.

16. The article of manufacture of claim 13, the logic further comprises creating the map file.

17. The article of manufacture of claim 13, the logic further comprises setting map display properties and a level of interaction.

18. The article of manufacture of claim 13, wherein the logic is performed by a browser plug-in.

* * * * *